H. M. FISK.
BATTERY BOX.
APPLICATION FILED JUNE 2, 1911.
1,036,597.
Patented Aug. 27, 1912.
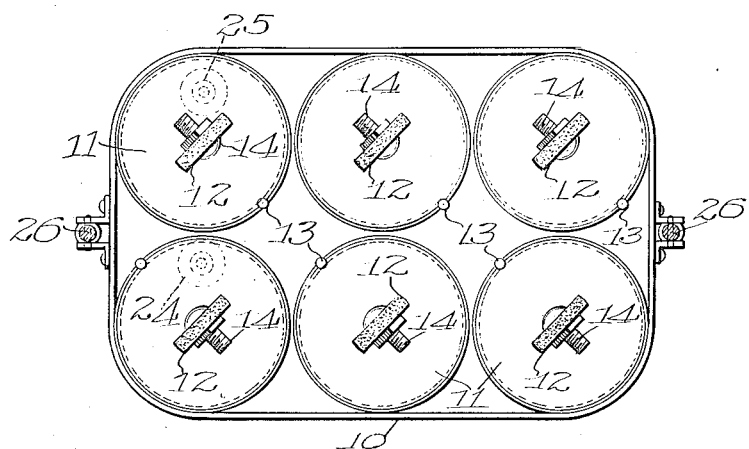
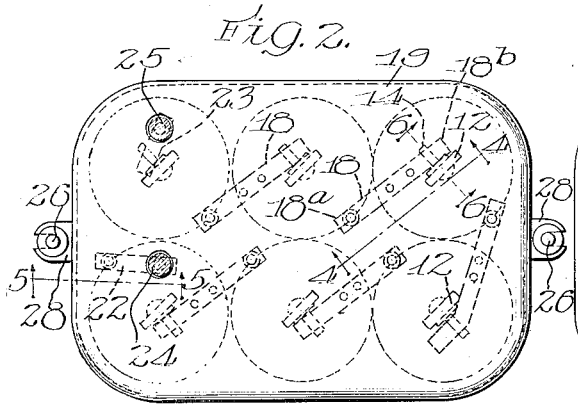
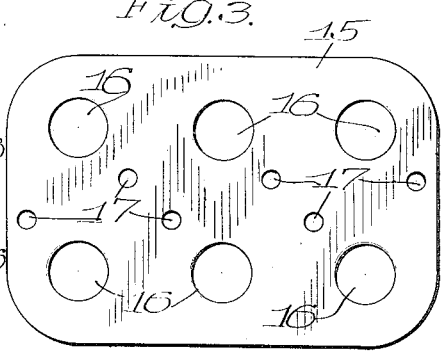
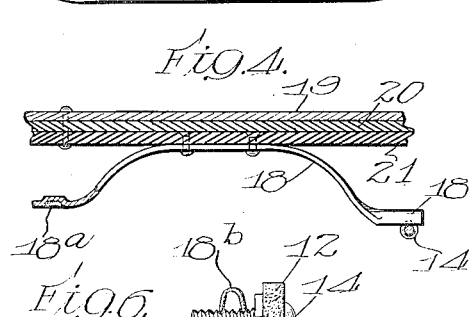
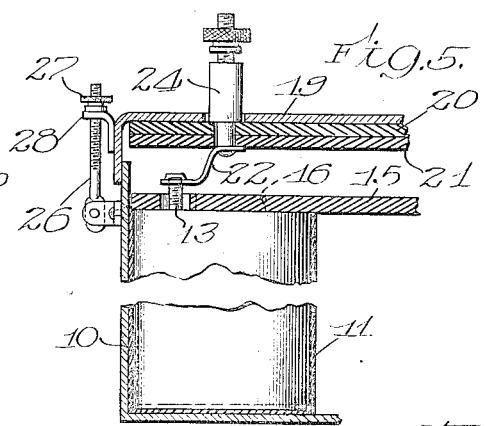
Witnesses:
Inventor:
Henry M. Fisk
By Cheever & Cox

UNITED STATES PATENT OFFICE.

HENRY M. FISK, OF WATSEKA, ILLINOIS.

BATTERY-BOX.

1,036,597. Specification of Letters Patent. Patented Aug. 27, 1912.

Application filed June 2, 1911. Serial No. 630,956.

To all whom it may concern:

Be it known that I, HENRY M. FISK, a citizen of the United States, residing at Watseka, in the county of Iroquois and State of Illinois, have invented a certain new and useful Improvement in Battery-Boxes, of which the following is a specification.

My invention relates to battery boxes, or receptacles for holding batteries, especially in automobiles and other self propelled vehicles, and the objects of the invention are first, to provide a receptacle which will protect the batteries and hold them safely in place, second to provide means for properly positioning the batteries in the receptacle, third to provide a construction such that when the cover of the receptacle is removed the batteries will all be disconnected, and conversely will be automatically and simultaneously connected by the mere act of putting the cover in place upon the receptacle. As a result of this characteristic any one of the batteries may be inserted or removed without the trouble of connecting or disconnecting a number of wires.

A fourth object of the invention is to provide simple and effective details of construction which will be hereinafter more specifically set forth.

I obtain my objects by the mechanism illustrated by the accompanying drawings, in which—

Figure 1 is a plan view of the receptacle with the cover removed. Fig. 2 is a plan view with the cover in position. Fig. 3 is a plan view of the templet or spacing member. Fig. 4 is a fragmentary sectional view of the cover showing one of the connectors in position thereon. The section is taken along the line 4—4, Fig. 2. Fig. 5 is a vertical sectional view taken along the line 5—5, Fig. 2. Fig. 6 is a fragmentary sectional view taken on the line 6—6, Fig. 2.

Similar numerals refer to similar parts throughout the several views.

The body 10 of the receptacle is preferably constructed of sheet metal and has rounded corners and is otherwise constructed so as to conform to the outline of a group of batteries 11, as illustrated for example in Fig. 1. The idea is to so proportion the box that it will hold the batteries securely and prevent shock and jar between them during the movement of the vehicle.

It will be understood that the ordinary dry batteries to be found upon the market have two terminals 12 and 13, the terminal 12 being located in the center of the battery and being rectangular in cross section and being provided with a binding screw 14. The terminal 13 of each battery is located at the outer edge of the top and is also screw threaded to serve as a binding screw. While this particular arrangement of the battery terminals is common in the batteries on the market today, it will be understood that under any type of construction the terminals will be separated from each other to a great or less extent, and the principle of my invention is such that any ordinary variations in the arrangement of the battery terminals may be accommodated without departing from the spirit of my invention.

The templet 15 consists preferably of wood fiber or other insulating material, and is so proportioned as to fit within the receptacle tightly enough to prevent any perceptible lateral motion, but loosely enough to permit it to be readily inserted or withdrawn. The templet has an aperture 16 for each of the central terminals 12, and an aperture 17 for each of the terminals 13. By preference these apertures are circular, as shown. They conform in diameter approximately to the size of the terminals, and are arranged according to a definite system so that the side terminals 13 will always occupy the same position in the receptacle. This positioning of the terminals is important for it brings them into place where they will be sure to be contacted by the connectors 18 fastened to the under side of the cover. These connectors 18 consist of brass or other suitable conductive and semiflexible material and by preference are provided at one end with a cap 18$^a$ adapted to fit over the terminals 13. At the other end said connectors are preferably arched as shown at 18$^b$ in Figs. 4 and 6 of the drawings. The advantage in this arched construction is that it causes two edges of the metal to be presented to the horizontal screws 14, which permits the metal to wedge partly into the screw threads at two different points on the screw, thereby insuring good contact. These connectors are so arranged as to conform to the arrangement of the battery terminals when the latter are positioned by the templet 15.

In the preferred construction the cover is composite, consisting of the upper and outer shell 19 lined by two layers 20 and 21, the latter being best shown in Figs. 4 and 5. The cover plate (19) consists preferably of a single piece of spun or stamped sheet metal flanged at the edges to fit the sides of the box. The linings 20 and 21 consist of sheets of wood fiber or other suitable insulating material. The connectors 18 are riveted or otherwise fastened to the under sheet 21, while the upper sheet 20 is interposed between the lower sheet and the cover shell 19. The three parts are held in place by riveting or other suitable fastening means. The advantage of this construction is that it affords a sheet 20 of insulating material between the metallic cover shell 19 and the rivets or other fastening means employed to hold the connectors in position. This removes all possibility of a short circuit between the connectors and the outer metallic shell of the cover.

In addition to the connectors 18 which serve to connect the positive terminal of one battery with the negative terminal of the next battery, are two terminal connectors 22 and 23. These are in general similar to the connectors 18, the connector 22 being adapted to contact a terminal 13 and the connector 23 being adapted to contact a terminal screw 14. The terminals 22 and 23 are connected to binding posts 24 and 25 respectively, which project up through the cover and are adapted to be connected to the outer circuit which they are to energize.

After the cover is in place it is fastened, and any desired degree of pressure is obtained, by means of clamp screws 26 which are hinged to the side of the receptacle and are provided with thumb nuts 27 adapted to overlie the bifurcated ears 28 projecting from the ends of the cover.

In assembling the apparatus the batteries are first lowered into the receptacle and their terminals are brought to a position to correspond with the apertures in the templet 15. The templet is then lowered into position with the battery terminals projecting up through it. The cover is then lowered into place with the result that the connectors 18 come into contact with the various battery terminals in such manner as to connect them up in series as will be apparent by reference to Fig. 2 of the drawings. At one end of the series the terminal screw 13 will make contact with the connector 22 leading to the main terminal 24, and at the other end of the series the terminal screw 14 will make contact with the connector 23 leading to the other main terminal 25. It will be noted that all of said connectors, which are of more or less flexible metal are bowed in such manner as to yield when pressure is exerted at their ends, hence an inequality in the height of the various battery terminals is compensated for by drawing the cover down tight into place, which is accomplished by screwing down the nuts 27 on the clamping screws 26. When this is accomplished, the parts will be not only securely held together and be capable of being transported and subjected to shock or jar without danger of injury to the batteries, but in addition, good contact between the various terminals and connectors will be assured.

It will be noted that the templet 15 is so formed that the apertures therein are symmetrical with reference to a longitudinal and a transverse median line drawn upon the cover and hence said templet is reversible end for end, and eliminates the need of any particular care on the part of the operator when the parts are being assembled.

Having thus described my invention, what I claim as new and desire to secure by Letters Patent is:—

1. In a device of the class described, the combination of a metallic receptacle for the batteries, a metallic cover therefor, an insulating plate secured to the underside of said cover, spring connectors secured to said plate and adapted to connect the battery terminals, means for vertically adjusting said cover, to thereby increase or decrease the pressure of the connectors on the battery terminals, and a loose plate fitting into the receptacle and having apertures therein for permitting the battery terminals to project up through them and be held in position thereby, said apertures being located in correspondence with the ends of the connectors for insuring engagement with the battery terminals when the cover is lowered.

2. In a battery box, the combination of batteries provided with horizontal binding screws, a receptacle for holding the batteries, a cover vertically adjustable upon the receptacle, and spring contactors on the underside of said cover which, when the cover is in position connects the positive terminal of one battery with the negative terminal of the next, said connectors consisting of strips of metal so bent at the end as to present the two lateral edges downwardly for the purpose of causing said lateral edges to enter between the threads on the binding screws, substantially as described.

3. In combination, a plurality of dry batteries each having a positive and a negative terminal projecting upward, a sheet metal receptacle for holding said batteries, a detached sheet metal cover having depending peripheral flanges making a vertically sliding fit with the outsides of said receptacle, means for vertically adjusting said cover, spring connectors mounted upon the underside of said cover and suitably insulated therefrom, said connectors being adapted at the end to engage the battery terminals to connect the positive terminal of one battery to the negative of the next, and a detached plate loosely fitting inside said receptacle and resting upon the batteries therein, said plate having apertures for permitting the battery terminals to pass up through to the connectors, said apertures being located in correspondence with the ends of the connectors for insuring engagement of the connectors with the proper battery terminals, substantially as described.

In witness whereof, I have hereunto subscribed my name in the presence of two witnesses.

HENRY M. FISK.

Witnesses:
 H. D. RIDDELL,
 J. S. EVANS.